Aug. 31, 1943.  E. A. HOLMES  2,328,015
PEA HULLING MACHINE
Filed Oct. 14, 1940  3 Sheets-Sheet 2

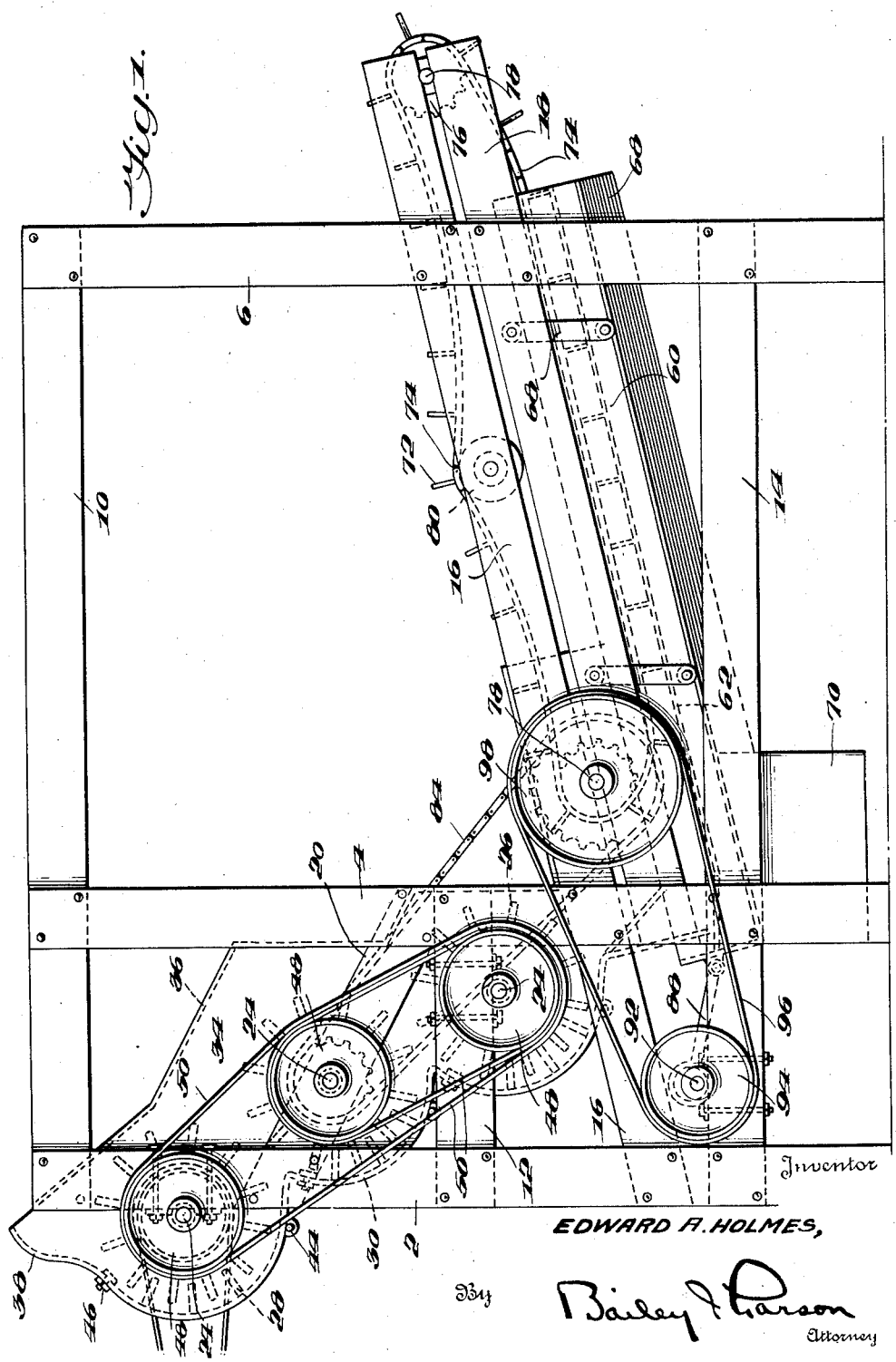

Inventor
EDWARD A. HOLMES,
By Bailey J. Parson
Attorney

Aug. 31, 1943.  E. A. HOLMES  2,328,015
PEA HULLING MACHINE
Filed Oct. 14, 1940  3 Sheets-Sheet 3
Fig. 3.
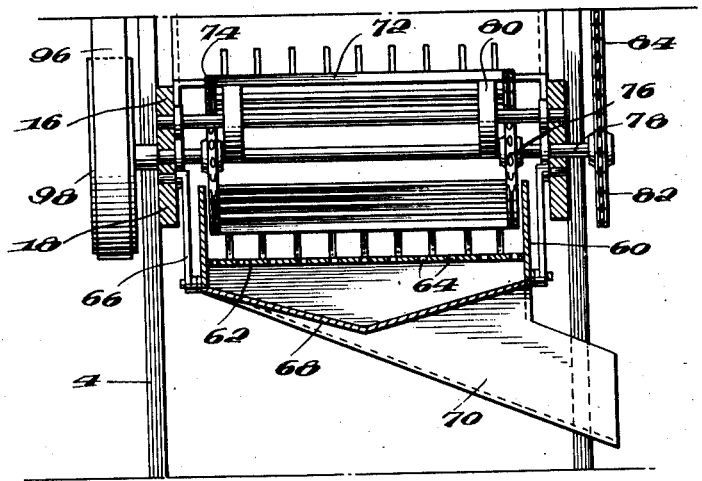
Fig. 4.
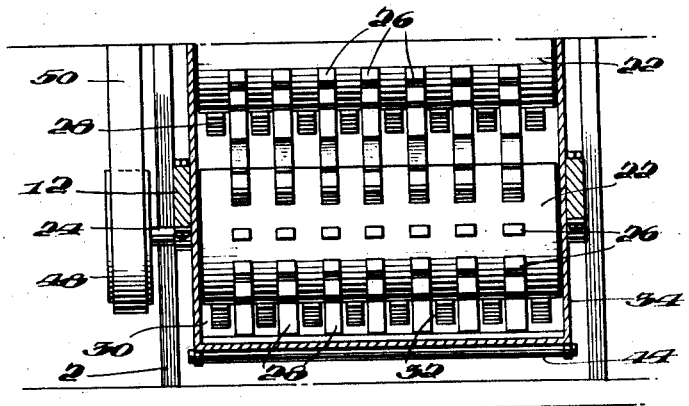
Fig. 5.
Inventor
EDWARD A. HOLMES,
By Bailey & Parson
Attorney Patented Aug. 31, 1943

2,328,015

UNITED STATES PATENT OFFICE 2,328,015

PEA HULLING MACHINE

Edward A. Holmes, Sandersville, Ga.

Application October 14, 1940, Serial No. 361,163

3 Claims. (Cl. 130—30)

This invention relates to an apparatus and method for shelling podded vegetables, and particularly green field peas (also known as cow peas or black-eyed peas) or the like.

The field pea has a long, narrow pod or shell, which is quite tough when the pea is green. Various devices have been utilized for shelling or hulling these peas, but all the machines heretofore used have been inefficient, bulky, complicated and expensive, and have required the use of large amounts of power.

The primary object of the present invention is to provide a simple and inexpensive yet efficient machine for shelling green field peas.

Another object of the invention is to provide a machine of this type which shells the peas without damage thereto, while removing practically all the peas from the hulls or pods.

A further object of the invention is to produce a mechanism which is small and light and can be operated with a low amount of power.

Still another object is to arrange the device in such a way that the parts can be easily cleaned.

I am aware that in prior devices for hulling various vegetables cooperating fixed and rotating fingers have been used. The present invention utilizes such devices. However, the prior arrangements have not been satisfactory, since they impart merely a squeezing action to the pods, and difficulties in the feeding of the pods have been encountered. According to the present invention, on the contrary, the peas are first squeezed by such an arrangement and are then thrown by centrifugal force against the teeth of a succeeding toothed wheel, which is rotating in a direction opposite to that of the travel of the peas. In this way the squeezed pods are subjected to a beating action which aids in loosening the peas therefrom. At the same time there is a positive feed from each unit to the next by momentum, so that difficulties with the passage of the peas and hulls through the machine are avoided.

Further objects and advantages of this invention will be apparent from the accompanying drawings which form a part thereof.

In the drawings:

Fig. 1 shows in side elevation a machine embodying my invention;

Fig. 2 is a longitudinal vertical cross section therethrough; and

Figs. 3, 4 and 5 are cross sections on the lines 3—3, 4—4 and 5—5, respectively, of Fig. 2.

The machine is mounted on a frame composed of uprights 2, 4, 6 and 8, horizontal members 10, 12 and 14 and inclined members 16, 18 and 20.

The machine includes a hulling section shown at the left of Fig. 1 and a threshing or separating section at the right.

The hulling section is composed of three units. Each of these units includes a drum 22 mounted to turn on a shaft 24, these shafts being carried by frame members 2, 20 and 12, respectively. Each drum is provided around its periphery with projecting fingers 26. These fingers interfit or alternate with fingers 28 fixed on a cylindrical wall portion 30 concentric with the shaft axis. The fingers 26 and 28 extend practically to the opposed surfaces of the wall portion and drum, respectively, so that beans cannot slip through without being acted on. The space 32 between the movable and fixed fingers is about the normal thickness of a bean, so as to exert a proper squeezing action thereon.

The three drums 24 are arranged in an inclined casing having side walls 34 and a top wall of irregular shape 36. The cylindrical walls 30 form the greater part of the lower wall of this casing. However, above the upper wall 30 is an extension 38 forming a feed chute. Also, each of the walls 30 terminates at its lower end in a straight extension 40 connecting with the top of the next lower wall portion 30. At the bottom this whole wall has a downwardly inclined discharge wall 42.

The cylindrical walls 30 are hinged at their lower ends about pivots 44, and are normally held up by nuts 46 engaging on bolts arranged in the casing. This permits easy access to drums 22 for cleaning or for repair.

The drums are driven by pulleys 48 on the outside of the casing, these pulleys being connected by belts 50. The upper shaft 22 carries on its other end a pulley 52 which is driven by a belt 54 from a suitable source of power. Any other type of drive might, of course, be employed. The drums, however, are all driven in the same direction, counterclockwise in Fig. 2.

The arrangement of the drums and the lower casing wall constitutes an important feature of the invention. It will be noted that the drums are in stepped relation and that the straight wall portion 40 at the bottom of each drum is directed so as to intersect the teeth of the next lower drum.

The operation of this part of the mechanism is as follows: The drums are driven at a high rate of rotation, from 600 to 800 revolutions per minute. With a drum of six inch radius, this means that the peripheral speed of the finger ends is about 2000 to 2500 feet a minute. Green peas in their hulls are fed to the feed chute formed by wall 38, and fall onto the upper drum. The fingers 26 engage the peas and draw them between the fixed fingers 28, thus bending and squeezing the hulls. This tends to open the hulls and, to some degree, to strip the peas therefrom.

When the peas have passed through the fixed fingers, they reach the end of the cylindrical wall 30 and come to the straight guiding wall 40. The peas are moving at a high velocity, and because of centrifugal force they travel away from the drum fingers in the direction of the arrow 56 (Fig. 2) and are thrown against the fingers of the next lower or intermediate drum. These fingers are moving counterclockwise, or in the opposite direction to the movement of the hulls, so that the relative speed of impact is increased. Thus the hulls are subjected to a severe beating action, which tends to remove the peas more thoroughly from the hulls without, however, doing any damage to the peas.

It will be noted that the drums and fingers are entirely independent and do not overlap each other, each acting as a separate squeezing unit, but cooperating with the next unit to exert a beating action. All rotate in the same direction, but are so staggered and encased that the peas leaving the periphery of one drum encounter an oppositely moving portion of the next lower one. In the specific construction shown, this is accomplished by arranging the drums in an inclined series which slopes downward in the direction of the movement of the lower portions of the drums.

After the beating action above described, the peas are squeezed again by the intermediate drum and again thrown against the lower drum and beaten thereby. They are then fed from the lower drum to the separating mechanism now to be described.

This part of the device includes an upwardly inclined trough of suitable length having side walls 60 between which is arranged a plate 62 having perforations 64 therein through which the beans can pass. The trough is mounted for reciprocating movement between the frame members 16, 18 by pivoted links 66. Below screen 62 is a trough-like bottom 68, for catching the peas, opening at its lower end into a transverse inclined discharge spout 70.

The hulls are fed by wall 42 into the lower end of the trough. They are carried up along the trough by rakes 72 carried by endless chains 74. Chains 74 are mounted on sprockets 76 on shafts 78, and also run over idler rolls 80. The inner and lower shafts 78 is driven by sprocket 82 and chain 84 from a sprocket 86 on intermediate drum shaft 22.

Reciprocating motion is imparted to the trough by a pitman 88 engaging an eccentric 90 on shaft 92 carried by frame member 14. This shaft is driven by a pulley 94 and belt 96 from pulley 98 on shaft 78.

Operation of the hulling unit, therefore, both drives the rakes and shakes the trough. As the hulls are dragged up the trough, the peas separate therefrom and fall through the screen to the discharge spout. The hulls fall over the end of the trough and may be disposed of in any suitable manner.

The machine thus described operates at a high rate of speed to remove practically all the peas from the hulls without damage thereto.

While I have described herein one embodiment of my invention, I wish it to be known that I do not intend to limit myself thereby, except within the scope of the appended claims.

I claim:

1. In a pea hulling machine, a pair of drums each having teeth extending threfrom, stationary partly cylindrical walls concentric with said drums, teeth on said walls interfitting with the teeth on said drums, means to drive said drums in the same direction, means mounting said drums with their axes in a line downwardly inclined in the direction of the movement of the lower sides of the drums, the tangent to the partly cylindrical wall opposite the upper drum at the end of the cylindrical part thereof intersecting the teeth of the next lower drum at a point where said teeth are moving towards the upper drum, whereby peas leaving the teeth of the upper drum are thrown against the teeth of the lower drum in a direction opposite to the direction of movement thereof.

2. In a pea hulling machine, a pair of parallel toothed cylinders arranged to act successively on the peas, the axes of said cylinders being spaced apart such a distance that the path of the teeth of said cylinders are adjacent but not intersecting, each of said cylinders being provided with a concave having a curved wall, said concaves having teeth thereon, the curved wall of the concave of the first cylinder terminating on a line which is substantially tangent to the base of the teeth on the second cylinder.

3. In a machine as defined in claim 2, a third cylinder having the same relation to the second cylinder as the second cylinder has to the first cylinder.

EDWARD A. HOLMES.